United States Patent [19]
Stein et al.

[11] Patent Number: 5,403,645
[45] Date of Patent: Apr. 4, 1995

[54] MOLDED-IN CLOTH INSERT DOOR TRIM

[75] Inventors: Arthur C. Stein, Grosse Ile; Loten T. Baskin, West Bloomfield, both of Mich.

[73] Assignee: General Motors Corporation, Detroit, Mich.

[21] Appl. No.: 41,109

[22] Filed: Apr. 1, 1993

[51] Int. Cl.⁶ .................................................. B32B 3/26
[52] U.S. Cl. ........................................ 428/138; 428/31; 428/139; 428/158; 428/213; 428/306.6; 428/309.9; 428/318.4
[58] Field of Search ................ 428/31, 138, 139, 158, 428/213, 306.6, 309.9, 318.4

[56] References Cited

U.S. PATENT DOCUMENTS

| | | | |
|---|---|---|---|
| 4,088,805 | 5/1978 | Wiegand | 428/139 |
| 4,102,721 | 7/1978 | Carey, Jr. | 156/79 |
| 4,323,406 | 4/1982 | Morello | 156/91 |
| 4,456,644 | 6/1984 | Janz et al. | 428/139 |
| 4,529,639 | 7/1985 | Peoples, Jr. et al. | 428/95 |
| 4,781,956 | 11/1988 | Zimmermann et al. | 428/43 |
| 4,810,452 | 3/1989 | Taillefert et al. | 264/247 |
| 4,996,090 | 2/1991 | Steinke et al. | 428/309.9 |
| 5,037,591 | 8/1991 | Rohrlach et al. | 264/46.5 |
| 5,073,318 | 12/1991 | Rohrlach et al. | 264/46.5 |

Primary Examiner—George F. Lesmes
Assistant Examiner—Blaine R. Copenheaver
Attorney, Agent, or Firm—Ernest E. Helms

[57] ABSTRACT

The present invention provides, in a preferred embodiment, an interior trim component for a motor vehicle including a first membrane with a connected foam backing, an apertured second membrane spread adjacent the foam backing of the first membrane, and a moldable rigid polymeric material providing a backing for the second membrane and supporting the first membrane, the moldable polymeric material penetrating the apertures of the second membrane and adhering to the foam backing of the first membrane.

9 Claims, 2 Drawing Sheets

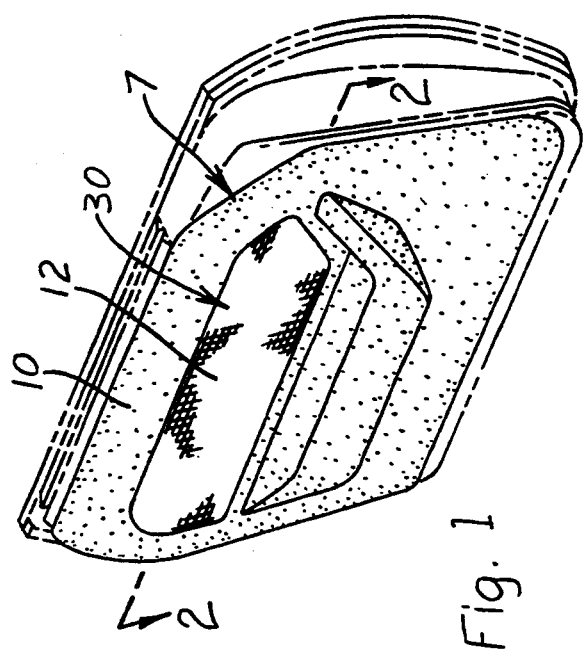
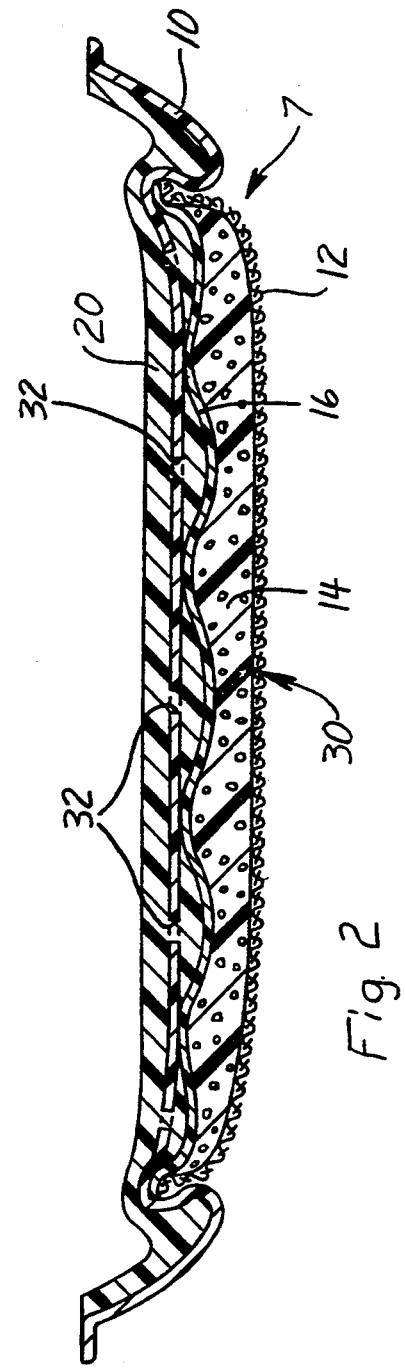

MOLDED-IN CLOTH INSERT DOOR TRIM

FIELD OF THE INVENTION

The field of the present invention is that of interior trim components, especially door panels, for automotive vehicles.

BACKGROUND OF THE INVENTION

Many automotive interior door panels are molded to have a two-tone texture color appearance. Typically, there is a main surface which covers the entire panel which is covered with a first color of vinyl. Located within the interior of the panel is an insert which is covered with an alternative color of vinyl or cloth. The insert typically also has additional foam padding to make it softer than the remainder of the panel, which is rigid. Typically, the insert is attached to the first color vinyl-covered rigid backing by gluing or some type of fastener arrangement.

SUMMARY OF THE INVENTION

The present invention provides an alternative interior trim component especially useful in vehicle doors which provides a two-tone effect which minimizes or totally eliminates any requirement for gluing or the utilization of fasteners to attach the insert to the vinyl-covered rigid backing, thereby reducing time and manufacturing and associated costs.

BRIEF DESCRIPTION OF THE DRAWINGS

FIG. 1 provides a perspective view of an interior door panel utilizing a preferred embodiment of the present invention.

FIG. 2 is a view taken along line 2—2 of FIG. 1.

DESCRIPTION OF THE PREFERRED EMBODIMENT

Figure 3:
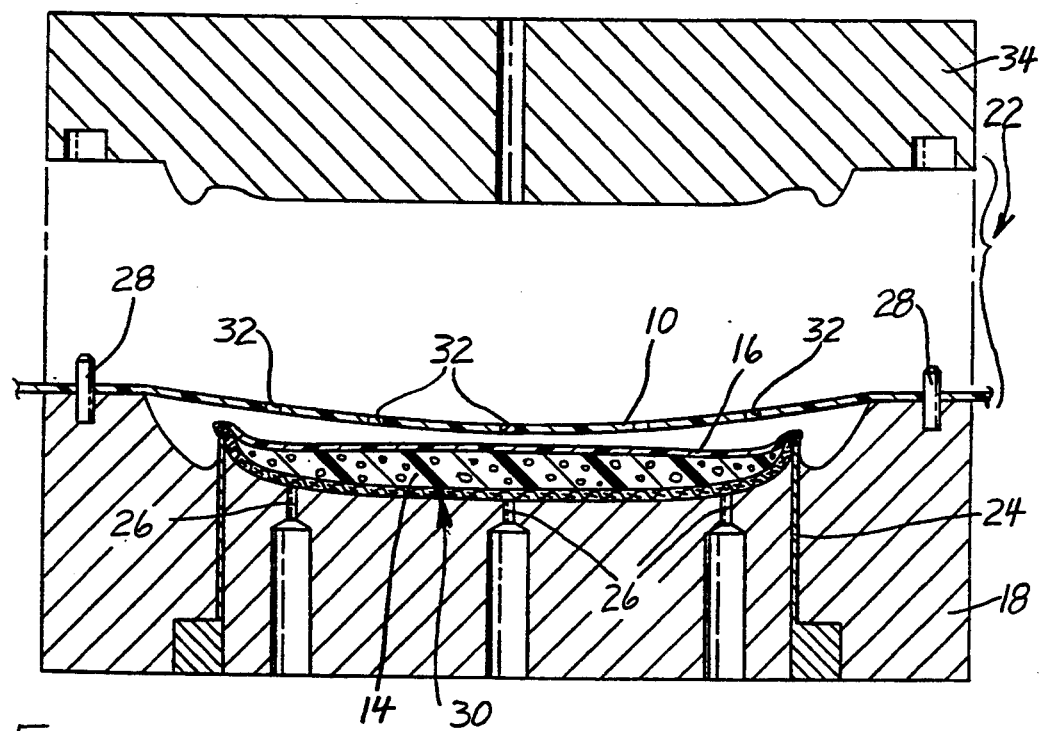
FIGS. 3 and 4 are a cross-section of the interior door panel as shown in FIG. 2 during the manufacturing process, positioned within a mold.

FIG. 1 illustrates an interior door panel 7 of the present invention. The interior door panel 7 has a base flexible vinyl skin 10 covering a glass-reinforced urethane rigid backing 20. A cloth skin can be substituted for the flexible vinyl skin so long as it has a nonporous backing. An insert 30 is provided in the door panel 7 which, in the example shown, has a membrane cover of cloth 12, although vinyl could be utilized. The cloth insert has an additional soft foam backing 14 often utilized to provide padding to the interior door panel 7 or for comfort or a decorative appearance.

Referring to FIG. 2, the insert is formed in a separate operation. As mentioned previously, the insert has a first vinyl or cloth membrane skin 12. Connected with this flexible membrane skin 12 is a soft foam backing 14, an example of which is polyether open or closed cell. The foam backing 14 has joined (by gluing) to its side opposite the cloth skin 12 a plastic film, such as sold under the trademark "MYLAR", backing 16 for reasons to be later described. The plastic film backing 16 is captured between the foam backing 14 and the vinyl skin 10.

Figure 4:
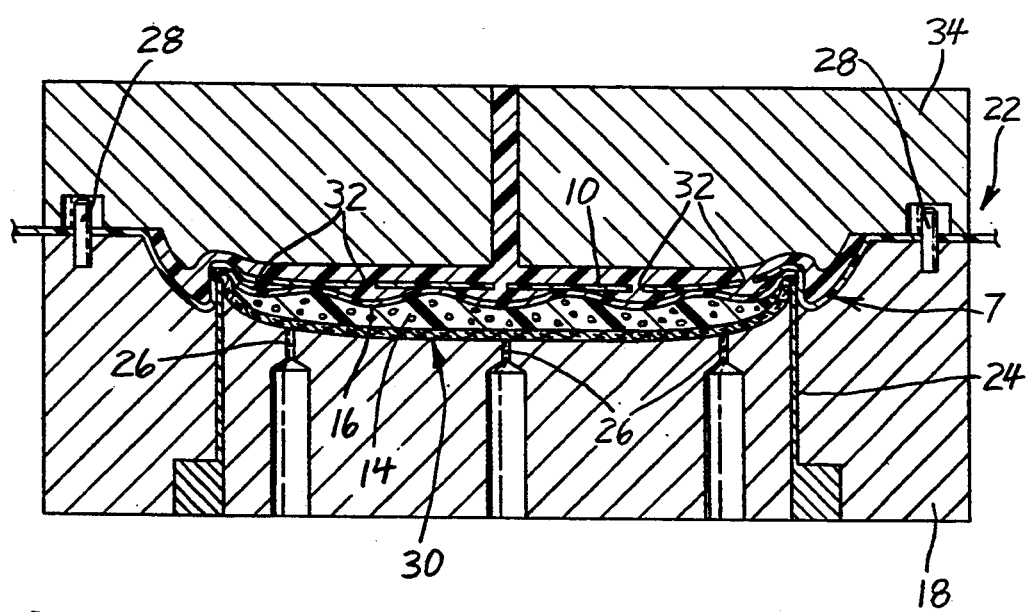

Referring additionally to FIGS. 3 and 4, in the manufacturing process the insert 30 is lowered into the lower half 18 of the mold 22. The mold 22 has an integral blade 24 typically matching the shape of the insert, and the insert is compliantly held in position by insertion within the blade 24. The blade 24 is typically fabricated from a durable noncorrosive material such as stainless steel. To aid in retaining the insert 30 in its proper location during the molding process, the insert 30 is exposed to a series of vacuums which are provided in apertures 26 of the mold lower half. In some embodiments of the present inventive process, the blades 24 may be entirely eliminated and the vacuum will be relied upon for positional fixation of the insert 30 within the mold cavity.

Stretched over the top of the blades is the backing cover or second membrane 10 typically comprised of vinyl material such as a solid layer-blowing agent bilaminate flexible PVC acriloniprile butadiene styrene copolymer or other suitable alternatives. The membrane 10 is held in position by a series of dowel pins 28 in tension to insure a lack of wrinkles in the finished part. This membrane has a series of aperture perforations 32 which typically measure 0.125 inches in diameter and are scattered on two-inch centers. The membrane 10 captures the foam backing 14 between itself and the membrane skin 12.

On top of the vinyl membrane 10 is placed a glass fiber reinforcement mat. The mat is a random weave one ounce per square foot material. If desired, the glass reinforcement mat can be deleted and the glass fibers can be mixed with the urethane.

The upper half 34 of the mold is closed. The mold is aluminum and has already been preheated to a temperature of 135° F. to 150° F. The urethane (a two-part isocyanate-polyol mixture) is injected on the side of the membrane 10 opposite the insert 30 at a rate of approximately 250 grams per second and at a temperature of approximately 85° F., filling the space behind the membrane 10 and thereafter seeping through the various apertures 32 in the membrane, adhering to the plastic film backing material 16, which provides a third membrane or backing for the insert 30. The plastic film backing 16 prevents penetration of the glass-reinforced urethane 20 into the soft foam backing 14 of, the insert 30 to prevent the insert from having various hard spots.

The urethane can be Imperial Chemical Industries 8700A/8711B with an index of 101 and a ratio of 0.535. The cream time is six seconds, and the gel time is 23 seconds. The end of reaction (EOR) time is 33 seconds, and the free rise density (FRD) is 4.3 pounds per cubic foot. The isocyanate orifice (not shown) is 1.3 mm in diameter, and the polyol orifice is 1.1 mm in diameter. At the end of two minutes, the interior door panel 7 is removed from the mold 22 and is ready for a trimming operation.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. An interior trim component for a motor vehicle comprising:
    a first cloth membrane with a connected foam backing;
    an apertured nonporous cloth second membrane spread adjacent the foam backing of the first membrane, capturing the foam backing between the second membrane and the first membrane;

a moldable rigid polymeric material providing a backing for the second membrane and supporting the first membrane, the moldable polymeric material penetrating the apertures of the second membrane and adhering to the foam backing of the first membrane; and a third membrane backing joined to the foam backing of the first membrane providing a surface for adhesion with the moldable polymeric material but preventing penetration of the moldable polymeric material into the foam backing of the first membrane, the third membrane being captured between the foam backing and the second membrane.

2. An interior trim component as described in claim 1 further including a fiber reinforcement mat positioned within the moldable plastic to reinforce the backing of the second membrane.

3. An interior trim component for a motor vehicle comprising:

a first cloth membrane with a connected soft foam backing;

an apertured vinyl second membrane spread adjacent the foam backing of the first membrane, capturing the foam backing between the second membrane and the first membrane;

a moldable fiber-reinforced rigid polymeric material providing a backing for the second membrane and supporting the first membrane, the moldable polymeric material penetrating the apertures of the second membrane and adhering to the foam backing of the first membrane; and a third membrane backing joined to the foam backing of the first membrane providing a surface for adhesion with the moldable fiber-reinforced polymeric material but preventing penetration of the moldable polymeric material into the foam backing of the first membrane, the third membrane being captured between the foam backing and the second membrane.

4. An interior trim component for a motor vehicle comprising:

a first cloth membrane with a connected foam backing;

an apertured nonporous vinyl second membrane spread adjacent the foam backing of the first membrane, capturing the foam backing between the second membrane and the first membrane;

a moldable rigid polymeric material providing a backing for the second membrane and supporting the first membrane, the moldable polymeric material penetrating the apertures of the second membrane and adhering to the foam backing; of the first membrane; and a third membrane backing joined to the foam backing of the first membrane providing a surface for adhesion with the moldable polymeric material but preventing penetration of the moldable polymeric material into the foam backing of the first membrane, the third membrane being captured between the foam backing and the second membrane.

5. An interior trim component as described in claim 4 further including a fiber reinforcement mat positioned within the moldable plastic to reinforce the backing of the second membrane.

6. An interior trim component for a motor vehicle comprising:

a first vinyl membrane with a connected foam backing;

an apertured nonporous vinyl second membrane spread adjacent the foam backing of the first membrane, capturing the foam backing between the second membrane and the first membrane;

a moldable rigid polymeric material providing a backing for the second membrane and supporting the first membrane, the moldable polymeric material penetrating the apertures of the second membrane and adhering to the foam backing of the first membrane; and a third membrane backing joined to the foam backing of the first membrane providing a surface for adhesion with the moldable polymeric material but preventing penetration of the moldable polymeric material into the foam backing of the first membrane, the third membrane being captured between the foam backing and the second membrane.

7. An interior trim component as described in claim 6 further including a fiber reinforcement mat positioned within the moldable plastic to reinforce the backing of the second membrane.

8. An interior trim component for a motor vehicle comprising:

a first vinyl membrane with a connected foam backing;

an apertured nonporous cloth second membrane spread adjacent the foam backing of the first membrane, capturing the foam backing between the second membrane and the first membrane;

a moldable rigid polymeric material providing a backing for the second membrane and supporting the first membrane, the moldable polymeric material penetrating the apertures of the second membrane and adhering to the foam backing of the first membrane; and a third membrane backing joined to the foam backing of the first membrane providing a surface for adhesion with the moldable polymeric material but preventing penetration of the moldable polymeric material into the foam backing of the first membrane, the third membrane being captured between the foam backing and the second membrane.

9. An interior trim component as described in claim 8 further including a fiber reinforcement mat positioned within the moldable plastic to reinforce the backing of the second membrane.

* * * * *